(12) United States Patent
Mabyalaht et al.

(10) Patent No.: US 11,232,280 B2
(45) Date of Patent: Jan. 25, 2022

(54) METHOD OF EXTRACTING FEATURES FROM A FINGERPRINT REPRESENTED BY AN INPUT IMAGE

(71) Applicant: Idemia Identity & Security France, Courbevoie (FR)

(72) Inventors: Guy Mabyalaht, Courbevoie (FR); Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 95 days.

(21) Appl. No.: 16/658,384

(22) Filed: Oct. 21, 2019

(65) Prior Publication Data
US 2020/0125824 A1 Apr. 23, 2020

(30) Foreign Application Priority Data
Oct. 19, 2018 (FR) ...................................... 1859682

(51) Int. Cl.
*G06K 9/00* (2006.01)
*G06K 9/32* (2006.01)
*G06K 9/62* (2006.01)
*G06N 3/04* (2006.01)
*G06N 3/08* (2006.01)

(52) U.S. Cl.
CPC ..... *G06K 9/00067* (2013.01); *G06K 9/00087* (2013.01); *G06K 9/3208* (2013.01); *G06K 9/6256* (2013.01); *G06N 3/04* (2013.01); *G06N 3/08* (2013.01)

(58) Field of Classification Search
CPC ........... G06K 9/00067; G06K 9/00087; G06K 9/3208; G06K 9/6256; G06K 9/00073; G06K 9/0008; G06K 9/00026; G06K 9/000114; G06K 9/00093; G06K 9/001; G06N 3/04; G06N 3/08
USPC ....................................................... 382/124
See application file for complete search history.

(56) References Cited

U.S. PATENT DOCUMENTS

2018/0165508 A1* 6/2018 Othman .................... G06K 9/42
2019/0340214 A1* 11/2019 Gudovskiy .......... G06N 3/0454

OTHER PUBLICATIONS

Zhang (Computer English Translation of Chinese Patent document No. CN 104992154 A), pp. 1-16. (Year: 2015).*
(Continued)

*Primary Examiner* — Daniel G Mariam
(74) *Attorney, Agent, or Firm* — Womble Bond Dickinson (US) LLP (57) ABSTRACT

The present invention relates to a method for extracting features of interest from a fingerprint represented by an input image, the method being characterized in that it comprises the implementation, by data processing means (21) of a client equipment (2), of steps of:
(a) Estimation of at least one candidate angular deviation of an orientation of said input image with respect to a reference orientation, by means of a convolutional neural network, CNN;
(b) Recalibration of said input image as a function of said estimated candidate angular deviation, so that the orientation of the recalibrated image matches said reference orientation;
(c) Processing said recalibrated image so as to extract said features of interest from the fingerprint represented by said input image.

16 Claims, 5 Drawing Sheets

(56) References Cited

OTHER PUBLICATIONS

Ouyang, J., Feng, J., Lu, J., Guy, Z., Zhou, J., 'Fingerprint Pose Estimation Based on Faster R-CNN', 2017 IEEE International Joint Conference on Biometrics (IJCB), IEEE, 2017, pp. 268-276, doi: 10 1109/btas.2017.8272707.

Scuch, P., Marek May, J., Busch, C., 'Unsupervised Learning of Fingerprint Rotations', 2018 International Conference of the Biometrics Special Interest Group (BIOSIG), Gesellschaft Fuer Informatik, 2018, pp. 1-6, doi: 10.23919/biosig.2018.8553096.

Correspondence from the French National Institute of Industrial Property Office (INPI—Institute National De La Propriete Industrielle) for FR1859682 dated Aug. 29, 2019; Preliminary Research Report of the French National Institute of Industrial Property Office for FR1859682 dated Aug. 23, 2019; and Written Opinion on the Patentability of the Invention issued by the French National Institute of Industrial Property Office for FR1859682.

* cited by examiner

METHOD OF EXTRACTING FEATURES FROM A FINGERPRINT REPRESENTED BY AN INPUT IMAGE

CROSS-REFERENCE TO RELATED APPLICATIONS

This application claims the benefit of French Patent Application No. 1859682 filed Oct. 19, 2018, the disclosure of which is herein incorporated by reference in its entirety.

GENERAL TECHNICAL FIELD

The present invention relates to the field of biometrics, and in particular proposes a method for extracting features of interest from a fingerprint represented by an input image, with a view to a biometric processing of the input image.

STATE OF THE ART

Biometric authentication/identification consists of recognizing an individual on the basis of biometric traits of that individual, such as fingerprints (digital recognition), the iris or the face (facial recognition).

Conventional biometric approaches use characteristic information of the biometric trait extracted from the acquired biometry, called features, and the training/classification is done on the basis of the comparison of these characteristics.

In particular, in the case of fingerprint recognition, fingertip images are processed so as to extract the features of a print that can be classified into three categories:

Level 1 defines the general pattern of that print (one of four classes: right loop, left loop, arch and spiral), and the overall layout of the ridges (in particular, an orientation map called "Ridge Flow Matrix"—RFM map—is obtained, which represents the general direction of the ridge at each point of the print).

Level 2 defines the particular points of the prints called minutia, which constitute "events" along the ridges (end of a ridge, bifurcation, etc.). The conventional recognition approaches essentially use these features.

Level 3 defines more complex information such as the shape of the ridges, pores of the skin, scars, etc.

The method of extracting features from a print (in the form of feature maps) is called "encoding," which make it possible to compose a signature called "template" encoding the useful information in the final phase of classification. More specifically, classification will be done by comparing feature maps obtained with one or more reference feature maps associated with known individuals.

Today there are "encoders" that efficiently perform this operation of extracting features, i.e. algorithms carrying out a set of processes:

Image improvement (contrast enhancement, noise reduction, etc.);

Use of dedicated filters (Gabor of different resolutions, differentiators, etc.);

Use of decision-making methods (thresholding for binarization, extraction of points, etc.).

One approach is to use neuron networks, which are already extensively used for data classification.

After an automatic training phase (generally supervised, meaning on an already classified reference database), a neural network "learns" and becomes capable on its own of applying the same classification to unknown data.

Convolutional neural networks (CNN) are a type of neural network wherein the connection pattern between neurons is inspired by the visual cortex of animals. They are thus particularly suited to a specific type of classification, which is image analysis; indeed they allow efficient recognition of people or objects in images or videos, in particular in security applications (e.g. automatic surveillance, threat detection, etc.).

Also, in the field of biometric authentication/identification, a CNN can be trained to recognize an individual on the basis of biometric traits of that individual insofar as those data are handled in the form of images.

However, although such approaches have enabled major advances for example in facial recognition, their application to the recognition of fingerprints runs up against specifics inherent in fingerprints and until now the performance has not been persuasive.

It would therefore be desirable to have a more efficient solution for extracting features from a fingerprint.

BRIEF DESCRIPTION OF THE INVENTION

According to a first aspect, the present invention relates to a method for extracting features of interest from a fingerprint represented by an input image, the method being characterized in that it comprises the implementation, by processing means of a client equipment's data, of steps of:

(a) Estimation of at least one candidate angular deviation of an orientation of said input image with respect to a reference orientation, by means of a convolutional neural network (CNN);

(b) Recalibration of said input image as a function of said estimated candidate angular deviation, so that the orientation of the recalibrated image matches said reference orientation;

(c) Processing said recalibrated image so as to extract said features of interest from the fingerprint represented by said input image.

According to other advantageous and nonlimiting characteristics:

said CNN comprises a set of successive convolution layers having a decreasing filter size and a decreasing number of filters;

step (a) comprises the identification of at least one potential angular deviation class of orientation of said input image with respect to the reference orientation among a plurality of predetermined potential angular deviation classes, each potential angular deviation class being associated with an angular deviation value representative of the class, the estimated candidate angular deviation(s) having as values the representative value(s) of the identified class(es);

each class is defined by an interval of angular deviation values;

said intervals are continuous and form a partition of a given range of potential angular orientation deviations;

said intervals are all of the same size;

step (a) comprises determining an orientation vector of said input image associating each of said plurality of potential angular deviation classes a score representative of the probability that said input data belongs to said potential angular deviation class;

the method comprises a prior training step (a0), by data processing means of a server, from a fingerprint image database where each image is already associated with a class of said plurality of predetermined potential classes of angular deviation, of parameters of said CNN;

said training uses a Sigmoid type cost function;

a recalibrated image is generated in step (b) for each estimated candidate angular deviation, step (c) being implemented for each recalibrated image;

said CNN is of the residual network type;

step (c) is also implemented on the non-recalibrated input image;

said features of interest to be extracted from the fingerprint represented by said input image comprise the position and/or orientation of minutia;

said fingerprint represented by the input image is that of an individual, the method further comprising a step (d) of identifying or authenticating said individual by comparison of the features of interest extracted from the fingerprint represented by said input image, with the features from reference fingerprints.

According to a second and third aspect, the invention proposes a computer program product comprising code instructions for the execution of a method according to the first aspect of extraction of features of interest of a fingerprint represented by an input image; and a storage means readable by a computer equipment on which a computer program product comprises code instructions for executing a method according to the first aspect of extraction of features of interest from a fingerprint represented by an input image.

DESCRIPTION OF THE FIGURES

Other characteristics and advantages of the present invention will appear upon reading the following description of a preferred embodiment. This description will be given with reference to the attached drawings in which.

DETAILED DESCRIPTION

Principle and Architecture

The present method proposes a method for extracting features of interest from a fingerprint represented by an input image. This method consists typically of "encoding" the print, i.e. said features of interest to be extracted are typically "biometric" features, namely "final" features making it possible to compose a template of the fingerprint for purpose of classification (identification/authentication of an individual by comparing the features of interest extracted from the fingerprint represented by said input image with the reference fingerprint features, see below). In this respect, said features of interest typically describe minutia, i.e. they comprise the position and/or orientation of the minutia. However, it will be understood that the present method is not limited to this embodiment, and all the features possibly of interest in biometrics can be extracted at the end of this method.

The present method is distinct in that it proposes a step (a) of direct estimation (from the input image) of at least one candidate angular deviation of an orientation of said input image with respect to a reference orientation, by means of a convolutional neural network, CNN. Coming back later on the notion of "direct" estimation, we will understand that it means no pre-processing of the input image.

Indeed, if the majority of the acquired fingerprints are acquired in a controlled environment and with correct orientation, in some cases (latent fingerprint images for example at a crime scene, images from smartphone acquisition, etc.) the acquisition, and specifically the orientation, are not controlled. In addition, if the extraction of features remains possible on an improperly oriented print, matching (i.e. matching with the features of a reference print) is difficult or even impossible if the fingerprints represented by the input image and the reference prints are not in the same reference frame.

Therefore, in an evaluation on a latent fingerprint basis, using an extractor/matcher developed for a perfectly recalibrated print, a deterioration in performance was observed, from 36% to 0%, as the differences in orientation between the latent print placement and the orientation of the reference print image increased.

The idea of this method is to allow in a step (b) the recalibration of said input image according to said estimated candidate angular deviation, so that the orientation of the recalibrated image matches said reference orientation.

Therefore, feature extraction can be implemented on a "well oriented" recalibrated image in order to obtain a robust process with respect to orientation variations.

It is understood that said reference orientation corresponds to an arbitrarily chosen orientation such as the one in which the finger is vertical and directed upwards, called "North-South", i.e. the natural orientation when the finger is pressed on a sensor under good conditions, corresponds to the usual orientation of the reference fingerprint databases. To reformulate, the reference orientation is preferentially fixed with respect to the finger orientation, in particular, equal to the finger orientation, but it will be understood that any reference orientation can be used as a starting point.

The angular orientation deviation can be expressed as an angle value, for example in the trigonometric direction (positive when the image is turned counter-clockwise, negative otherwise).

For example, it can be chosen in a range [0°, 360°] or a range [−180°, +180°] in an equivalent way. In addition, a 360° range is preferred as it corresponds to all potential orientations, but it will be understood that it is possible to work on a smaller range corresponding to most of the orientations observed, for example [−45°, +45°]. Indeed, in a smartphone fingerprint sensor-type application, it is very rare to have an orientation deviation of 180°, i.e. a completely reversed fingerprint, but, on the other hand it is very common to have deviations of 10°-20° in absolute value with respect to the reference orientation. Alternatively, in the analysis of latent prints (crime scene for example), any orientation of the fingerprint can be found.

It should be noted that it is known to recalibrate a fingerprint image as "pre-processing" by image processing algorithms, but it has been discovered that it was possible to perform this recalibration very effectively with neural networks, especially without the need to use a reference image (or model). This is due to, during the training process, the CNN learns to use only the information in the image that is to be recalibrated. In other words, the network has only one entry.

It should be also noted that the use of "detection" CNN such as Faster R-CNN (see document, *Fingerprint Pose Estimation Based on Faster R-CNN*, Jiahong Ouyang et al.) or YOLO, is known to estimate the placement of a print, i.e. the position of its center and orientation. More precisely, a detection CNN is capable of detecting elements of interest (objects) of various categories in an image in the form of a "bounding box": a first "pre-processing" module (of VGG-16 type in Faster R-CNN), again of "pre-processing" extracted from the candidate areas of the input image as potential bounding boxes of an element of interest, and a "post-processing" module selects/classifies the most probable bounding boxes (i.e. determines the category of the interest element in the box). To use a detection CNN to estimate an orientation, it is sufficient to consider various fingerprint orientations as different categories of elements of interest. Therefore, once the best bounding box has been identified for a print in the entry image, the center of the predicted bounding box and the associated category are extracted to deduce the corresponding position.

However, such an "indirect" approach remains inconvenient in terms of the power required and its results can be improved, especially if the print is not of good quality. As shown below, another advantage of the present approach is that orientation deviations can be extracted automatically, without any prior information on their nature, and especially when the fingerprint is degraded or has a "whorl" type (i.e. a whorl, also called a spire or whirlpool) that does not distinguish between left and right unlike an "arch" type.

Figure 1:
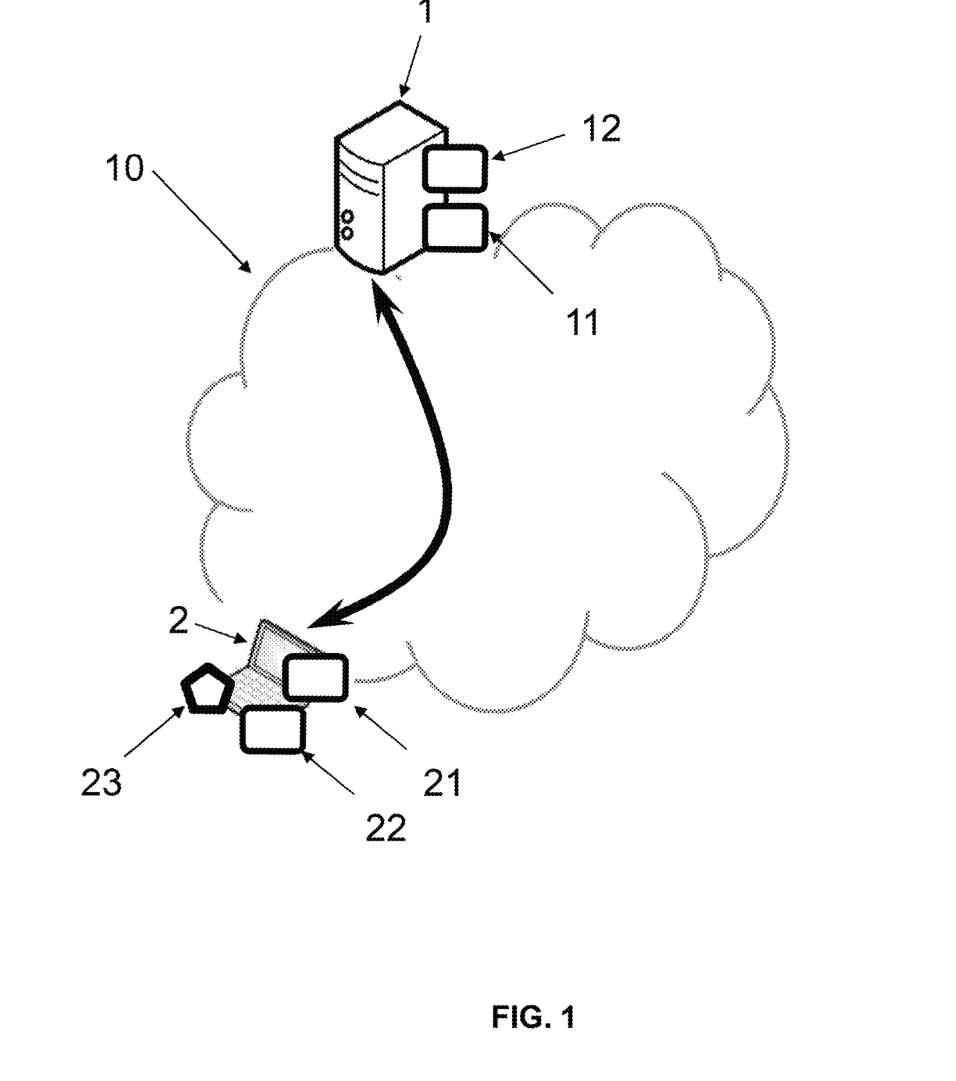
FIG. 1 is a diagram of an architecture for implementation of the method according to the invention.

The present method is implemented within an architecture such as shown by FIG. 1, with a server 1 and a client 2. The server 1 is the training device (implementing the training of the CNN) and the client 2 is a classification device (implementing the present method of extracting features of interest from a fingerprint), for example a user terminal.

It is quite possible for both devices 1, 2 to be combined, but preferably server 1 is that of a security service provider, and client 2 a personal consumer device, particularly a smart phone, a personal computer, a tablet, a safe, etc., or latent fingerprint acquisition equipment.

In any case, each device 1, 2 is typically remote computer equipment connected to an extended network 10 such as the Internet for the exchange of data. Each comprises data processing means 11, 21 of processor type, and data storage means 12, 22 such as computer memory, for example a flash memory or a hard disc.

The server 1 stores a training database, i.e. a set of fingerprint images for which orientation is already known (see below how to represent it) in contrast with said input images that are to be processed.

The client device 2 advantageously comprises a fingerprint scanner 23, so as to be able to directly acquire said input image, typically so that a user can be authenticated.

CNN

A CNN generally comprises four types of layers successively processing information:

the convolution layer which processes blocks from the input one after the other;

the nonlinear layer which implements an activation function allowing to add nonlinearity to the network and therefore having much more complex decision functions;

the pooling layer with which to combine several neurons into a single neuron;

the fully connected layer which connects all the neurons from one layer to all the neurons of the preceding layer (for classification).

The non-linear layers are often preceded by a batch normalization layer ("BN layer") before each nonlinear layer NL, so as to accelerate the training.

The non-linear layer NL activation function is typically the ReLU function (Rectified Linear Unit) which is equal to f(x)=max(0, x) and the most used pooling layer (labeled POOL) is the function AvgPool which corresponds to an average among the values of a square (several values are pooled into only one).

The convolution layer, labeled CONV, and the fully connected layer, labeled FC, generally correspond to a scalar product between the neurons of the preceding layer and the weights from the CNN.

In general, a CNN typically comprises a set of successive convolution layers. In a known way and as explained above, each of said convolution layers can be followed by a batch normalization layer BN and/or a non-linear layer, in particular ReLU, preferably both in that order.

Typical CNN architectures stack several pairs of CONV NL layers and then add a POOL layer and repeat this plan [(CONV NL)$^p$→POOL] until getting a sufficiently small size output factor, and then ending by two fully connected FC layers.

This is a typical CNN architecture:

INPUT→[[CONV→NL]$^p$→POOL]$^n$→FC→FC

Advantageously, the direct determination of the angular orientation deviation is seen as a "pure" classification of the input image, i.e. the problem is quantified, without any object detection task being involved.

In other words, this classification CNN does not predict any bounding box or directly estimates precise values of candidate orientation angular deviation, but directly identifies at least one potential class of orientation angular deviation of said input image with respect to the reference orientation among a plurality of predetermined potential angular deviation classes, each potential angular deviation class being associated with an angular deviation value representative of the class (which will be the value taken into account when a class is identified). By "directly", it is understood that this CNN associates one or more classifications with the input image without prior processing. This is in contrast to the mentioned CNNs of the Faster R-CNN type in which the detection block (such as VGG-16) proposes candidate bounding boxes, which are each selected and classified; in other words, the classification is implemented on the candidate boxes (i.e. indirectly) and not directly the image as a whole. Naturally, any CNN produces a number of internal states that feature maps are, including in this case of said "direct" classification, but such feature maps are part of the normal functioning of any CNN, in contrast to the intermediate results that the candidate enclosures of a detection CNN are.

It is also understood that this CNN associates only classifications (as will generally be seen as a confidence score) with the input image, but not other outputs such as including box coordinates or even an annotated image.

Each class is defined in particular by an interval (preferably continuous, but possibly a discontinuous union of continuous sub-intervals) of angular deviations, and the angular deviation value representative of the class is then typically the average value of the interval. For example, an interval [10°, 20°] can be associated with the value 15°. The set of intervals preferably forms a partition of a range of angular deviations of potential orientations (repeated as 360°, or less).

According to a first possibility, the intervals defining the classes are all the same size. For example, 360 classes of 1 degree each (for example, [2°,3°] is an interval), or 60 classes of 6 degrees each (for example [6°,12°] is an interval) can be considered.

A second possibility is that the intervals defining the classes have different sizes, particularly according to a probability density. For example, for a smartphone fingerprint sensor-type application, it is, as explained, much more likely to have an orientation deviation in the range of 10°-20° than a deviation of 90°-100°. In such an application, narrower intervals can be expected for small deviations than for large deviations, for example on one side [2°, 4°] and on the other side [90°, 105°]. The person skilled in the art will be able to construct any set of classes of deviation of orientation of his/her choice.

It is understood that the estimated candidate angular deviation values are theoretical class function values, and more precisely angular deviation values representative of the classes. Therefore, for a given fingerprint image, the CNN identifies one or more candidate classes, i.e. defined by an interval likely to contain the actual value of the angular deviation of orientation of this image with respect to the reference orientation (it is noted that several classes can be identified, see below, although in practice the actual angular deviation has a unique value), and for each identified class, the representative angular deviation value of the class is considered as a candidate angular deviation estimated in step (a).

For example, in a 60-class embodiment of equal size, with an input image having an actual angular orientation deviation of 11°, then the class corresponding to the interval [6, 12°] is identified, and if the representative value of this class is 9° (in the case of the average), then the estimated value of the candidate angular deviation is 9°.

A plurality of classes can be identified if the CNN returns an orientation vector, i.e. a score for each class. More precisely, the orientation vector of an input image associates each of the plurality of classes with a score representative of the probability of belonging of said input data to the potential angular deviation class; in other words, the probability that the actual angular deviation of orientation belongs to the corresponding interval. The vector, therefore, has a dimension equal to the number of classes, i.e. 60 in our example. It is understood that a classification CNN, as defined above, prefers to return only the orientation vector, as opposed to a detection CNN.

As shown below, the class or classes identified may be the k (for example, two) with the highest score (i.e., a fixed number of classes are identified), or all those with a score above a predetermined threshold (for example, probability greater than 10%, or even probability greater than 20%, depending on the desired flexibility and the "risk" of having improperly oriented input images. For example, for a latent fingerprint scanner, the threshold can be lowered to maximize the number of peaks considered due to the potential multiplicity of plausible orientations).

Said CNN can be of many types, including a conventional CNN (direct succession of CONV convolution layers, BN batch normalization layers, and NL non-linear layers).

According to a preferred embodiment, said CNN is of the residual network type. It can be seen that such residual networks are very efficient for their unique task of classifying the input image, and much lighter than detection CNNs, whose blocks such as VGG-16 or VGG-19 of image processing are particularly massive.

Figure 2:
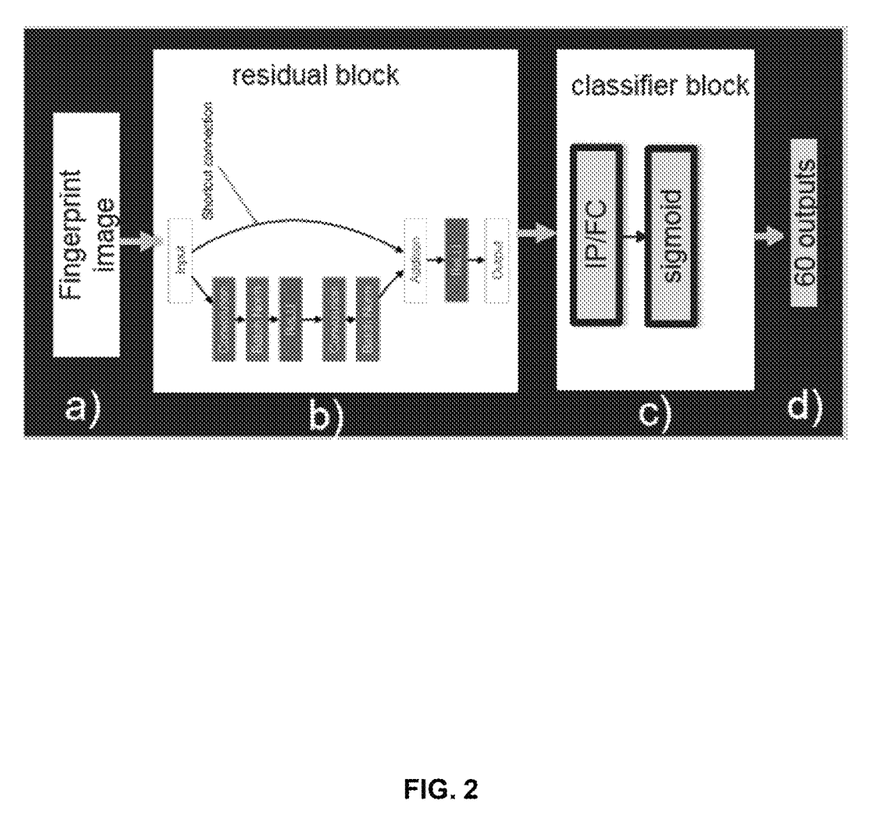
FIG. 2 depicts an example of convolutional neural network for the implementation of the method according to the invention.

With reference to FIG. 2, a residual network, or RESNET, is a CNN with at least one "residual connection" (also known as "skip connection" or simply "short-cut"), i. e. a connection from which at least one layer is "short-circuited", by analogy with what is found in the pyramidal neurons of the brain.

Indeed, when a model is made more complex by adding layers, some of these layers can have a negative impact on the model's performance. Residual connections ensure that if a useful transformation is not learned, one layer must at worst learn the identity, avoiding degrading the performance of the other layers. The operating principle behind the residual networks is to add point by point the entry and exit of a convolution layer, allowing the signal to propagate from the superficial layers to the deeper ones. As explained, this network provides excellent results in direct determination of angular deviation of orientation, and in particular in pure classification.

In the RESNET example in FIG. 2, in a classical way, the main branch (shorted by the residual connection) has a plurality of convolution layers each followed by a batch normalization layer and/or a non-linear layer of the ReLU type. The output of this branch is typically added point by point with the input image (due to the residual connection), and goes through a final activation layer of the ReLU type, with a reduction in dimensionality (typically MaxPool).

A fully connected layer (IP/FC) allows the generation of the orientation vector (i.e. the classification itself), and a Sigmoid or Softmax loss function can be used for training, see below.

Training and Classification

Advantageously, the method begins by a training step (a0), by the data processing means 11 of the server 1, from a database of labeled fingerprint images (i.e. for which the corresponding angular deviation class of orientation is known), from parameters of said CNN.

This training can be done in a traditional way, minimizing the loss function.

The main difficulty of this approach is to extract the features relevant to the determination of the expected angular deviation, while penalizing those features that do not allow class discrimination. In order to do this, a first possibility is to use a cross entropy on a Softmax as a loss function, since it allows to extract those features that maximize the probability of the expected angle deviation and it penalizes the probability of the other angle deviations (i.e. of the other classes).

The Softmax function favors only one class, alternatively if it is desired to increase the chances of having several identified classes, a Sigmoid can be used as a loss function to privilege not only the expected angular deviation of orientation, but also, with a lower probability, those who are closest.

Figure 3:
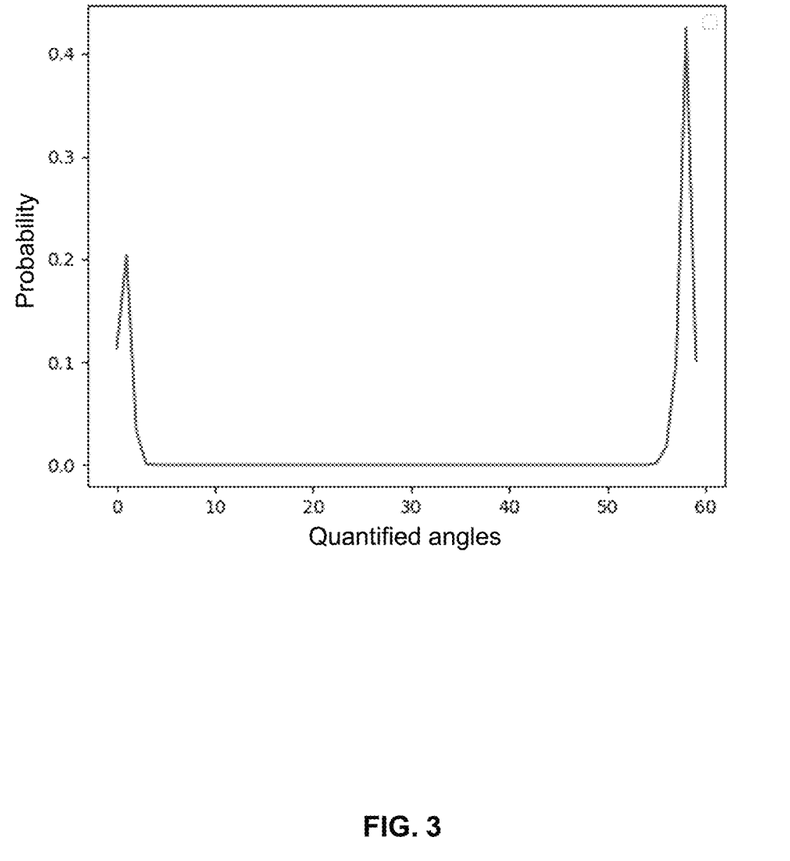
FIG. 3 represents an example of an orientation vector obtained using said convolutional neural network.

Therefore, if the input image is partial and has, for example, a part (e. g. a loop) that can be located, for example, to the right or left of a fingerprint, the orientation vector will have two distinct peaks of scores, see for example FIG. 3, so as to take into account the two potential cases, each of which remains probable.

Note that said database of already labeled fingerprint images can be obtained by increasing data. More precisely, a reference database in which all images are oriented according to the reference orientation is the starting point (i.e. zero orientation angular deviation). Other versions of these reference prints are then artificially generated by applying various angles of rotation to them (and labeled accordingly), so as to create new training images with varying orientation deviations. For example, angles of ±[5°, 10°, 20°, 30°, 40°, 70°, 120°] are applied to them, creating a new database 14 times larger, to ensure the robustness of the CNN against common acquisition defects.

The trained CNN can be stored as necessary on data storage means 22 of the client 2 for use in orientation estimation. It should be noted that the same CNN can be embedded on numerous clients 2, only one training is necessary.

In a main step (a), as explained, at least one candidate angular deviation of an orientation of said input image with respect to a reference orientation is estimated by the data processing means of the client 2 using the embedded CNN.

Then, in a step (b), said input image is recalibrated according to said estimated candidate angular deviation, so that the orientation of the recalibrated image matches said reference orientation. Note that a recalibrated image can be generated in step (b) for each estimated candidate angular deviation. The idea is that if several probability peaks emerge, it is not possible to know which one is the right one, so all of them need to be evaluated. Therefore, one of the recalibrated images will be "well recalibrated" i.e. oriented in accordance with the reference orientation.

Finally, in a step (c), said recalibrated image can be processed so as to extract said features of interest from the fingerprint represented by said input image, which notably can comprise the position and/or orientation of minutia. If several recalibrated images have been generated, step (c) is implemented for each one. In particular, this step (c) can be implemented by means of a second dedicated CNN, taking as input each recalibrated image. This is referred to as a recalibration CNN for the first CNN, and a coding CNN for the second. Any known coding CNN can be used here.

Note that step (c) can also be systematically implemented on the input image "as is", i.e. without recalibration (in other words, the input images are added with the recalibrated images). Indeed, if the input image is already well oriented, the CNN may tend to recalibrate it anyway, which may lead to a slight decrease in performance.

Preferably, the method further comprises a step (d) of identifying or authenticating said individual by comparing the features of interest extracted from the fingerprint represented by said input image, with the fingerprint features of reference, which can be implemented in any known way by the person skilled in the art.

For example, the client 2 can store the features of the prints of one or more authorized users as reference prints, so as to manage the unlocking of the client equipment 2 (particularly in the case of an input image acquired directly by an integrated scanner 23); if the extracted features correspond to those expected from an authorized user, the data processing means 21 consider that the individual attempting to be authenticated is authorized, and they proceed with the unlocking.

Alternatively, the client 2 can send the extracted features to a remote database of said reference fingerprint features, for identification of the individual.

Figure 4A:
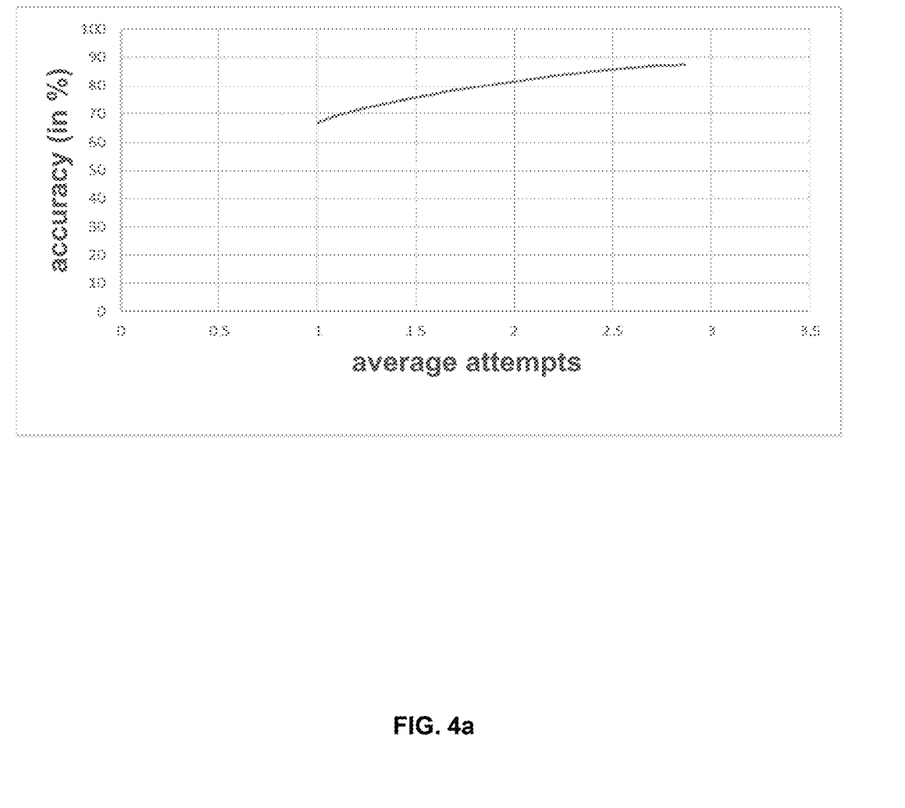
FIGS. 4a-4b illustrate two performance tests of different modes of carrying out a process according to this invention.

Different tests of the present method have been carried out. FIG. 4a shows the performance of the recalibration CNN in predicting angular deviation of orientation as a function of the average number of attempts, i.e. the average number of recalibrated images obtained. There is an increase in accuracy to nearly 90% when moving from one attempt (i.e. only the highest peak is considered), to an average of 2.8 attempts.

Figure 4B:
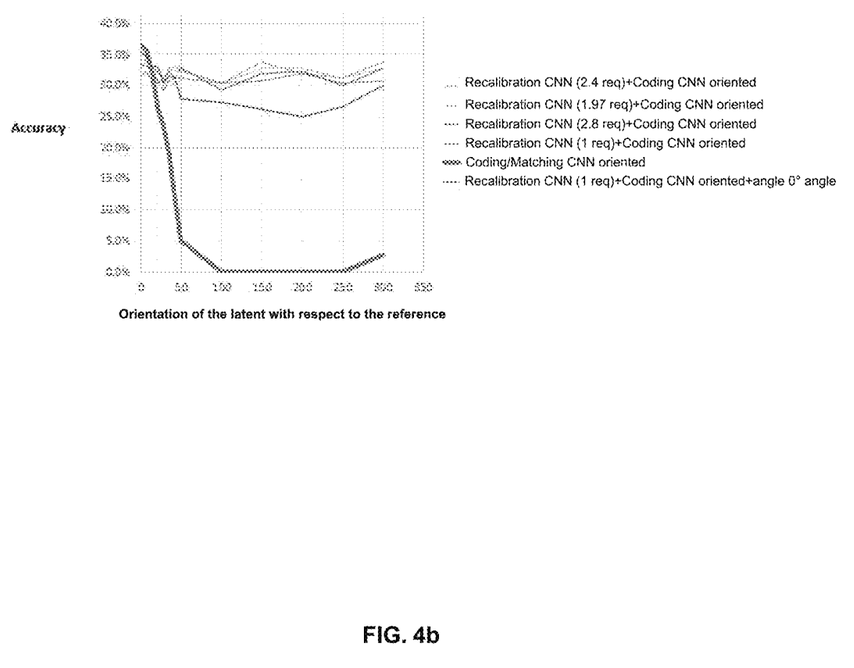

FIG. 4b shows the matching performances, as a function of the real angular deviation of orientation: it can be noted that in the absence of recalibration (a single coding CNN used directly for the extraction of features), performances decrease due to even a few degrees of deviation.

On the other hand, the various tested configurations, all of which include a first recalibration CNN and a second coding CNN, and which differ in the average number of attempts, show that performance is maintained regardless of the angular deviation in orientation. The embodiment, which also includes the systematic use of the input image (not recalibrated), is a little less effective for large orientation deviations (since the input image is not relevant), but more effective if the angular orientation deviation is small, which remains a frequent case.

Computer Program Product

According to a second and third aspect, the invention relates to a computer program product comprising code instructions for execution (in particular on data processing means 11, 21 of the server 1 and/or of the client 2) of a method of extracting features of interest from a fingerprint represented by an input image, as well as storage means readable by a computer equipment (a memory 12, 22 of the server 1 and/or of the client 2) on which said computer program product is located.

The invention claimed is:

1. A method for extracting features of interest from a fingerprint represented by an input image, the method being characterized in that it comprises the implementation, by data processing means (21) of a client equipment (2), of steps of:
   (a) Direct estimation from the input image of at least one candidate angular deviation of an orientation of said input image with respect to a reference orientation, by means of a convolutional neural network (CNN);
   (b) Recalibration of said input image as a function of said estimated candidate angular deviation, so that the orientation of the recalibrated image matches said reference orientation;
   (c) Processing said recalibrated image so as to extract said features of interest from the fingerprint represented by said input image.

2. A method according to claim 1, wherein step (a) comprises the identification of at least one potential angular deviation class of orientation of said input image with respect to the reference orientation among a plurality of predetermined potential angular deviation classes, each potential angular deviation class being associated with an angular deviation value representative of the class, the estimated candidate angular deviation(s) having as values the representative value(s) of the identified class(es).

3. A method according to claim 2, wherein each class is defined by an interval of angular deviation values.

4. A method according to claim 3, wherein said intervals are continuous and form a partition of a given range of potential angular orientation deviations.

5. A method according to claim 4, wherein said intervals are all of the same size.

6. A method according to claim 2, wherein step (a) comprises determining an orientation vector of said input image associating each of said plurality of potential angular deviation classes to a score representative of the probability that said input data belongs to said potential angular deviation class.

7. The method according to claim 2, comprising a prior training step (a0), by data processing means (11) of a server (1), from a fingerprint image database where each image is already associated with a class of said plurality of predetermined potential angular deviation classes, from parameters of said CNN.

8. A method according to claim 7, wherein said training uses a Sigmoid-type loss function.

9. A method according to claim 1, wherein a recalibrated image is generated in step (b) for each estimated candidate angular deviation, step (c) being implemented for each recalibrated image.

10. A method according to claim 1, wherein said CNN is of the residual network type.

11. A method according to claim 1, wherein step (c) is also carried out on the non-recalibrated input image.

12. The method according to claim 1, wherein said features of interest to be extracted from the fingerprint represented by said input image comprise the position and/or orientation of minutia.

13. The method according to claim 1, wherein said fingerprint represented by the input image is that of an individual, the method further comprising a step (d) of identifying or authenticating said individual by comparison of features of interest extracted from the fingerprint represented by said input image, with the features of reference fingerprints.

14. A method according to claim 1, wherein said CNN does not perform any object detection task in the input image.

15. A non-transitory computer program product comprising code instructions for the execution of a method according to claim 1 of extraction of features of interest from a fingerprint represented by an input image, when said program is executed on a computer.

16. A non-transitory computer readable storage means readable by a computer equipment on which a computer program product comprises code instructions for the execution of a method according to claim 1 of extraction of features of interest from a fingerprint represented by an input image.

* * * * *